March 1, 1938.  G. H. THOMAS  2,109,935
COUPLING
Filed Dec. 17, 1936  2 Sheets-Sheet 1

INVENTOR.
George H. Thomas
BY
Florian G. Miller
ATTORNEY.

March 1, 1938.  G. H. THOMAS  2,109,935
COUPLING
Filed Dec. 17, 1936  2 Sheets-Sheet 2

INVENTOR.
George H. Thomas
BY
Florian G. Miller
ATTORNEY.

Patented Mar. 1, 1938

2,109,935

UNITED STATES PATENT OFFICE 2,109,935

COUPLING

George H. Thomas, Erie, Pa.

Application December 17, 1936, Serial No. 116,242

7 Claims. (Cl. 64—31)

This invention relates to shaft couplings and more particularly to shaft couplings by which power can be transmitted from one shaft to another when the shafts are mis-aligned angularly, off-center or both; and also to permit endwise and rotational movement.

All devices of this character made according to the teachings of the prior art and with which I am familiar have had very short operating lives because of the localized pressure points between the driving and driven members of the coupling and the coupling block. These prior couplings were short-lived especially when operated in the presence of acid fumes because the points of contact between the driving and driven members and the coupling block became rusted and corroded and the resulting grinding action therebetween quickly wore them down to a point of unserviceability. This wearing action required the frequent replacement of the driving and the driven members of the couplings as well as the coupling blocks with the resulting loss of time and at a great cost. A considerable number of machine operations were necessary to complete these driving and driven members and coupling blocks originally therefore increasing their original cost.

It is accordingly an object of my invention to overcome the above defects in a coupling and it is the principal object of my invention to provide a coupling whose opposing bearing surfaces remain in parallel relation and whose bearing surfaces are easily and quickly replaceable.

Another object of my invention is to provide a coupling which is easy to manufacture, economical in use, cheap in cost, and easy to maintain.

Another object of my invention is to provide a coupling which will eliminate expensive machine work.

Another object of my invention is to provide a coupling which may easily be adapted for use under acid conditions.

Another object of my invention is to provide a coupling having quickly and easily replaceable bearing surfaces which may be of any suitable material.

Another object of my invention is to provide a novel means of preparing the bearing surfaces of a coupling.

Other objects of my invention will become evident from the following detailed description, taken in conjunction with the accompanying drawings, in which—

Figure 1:
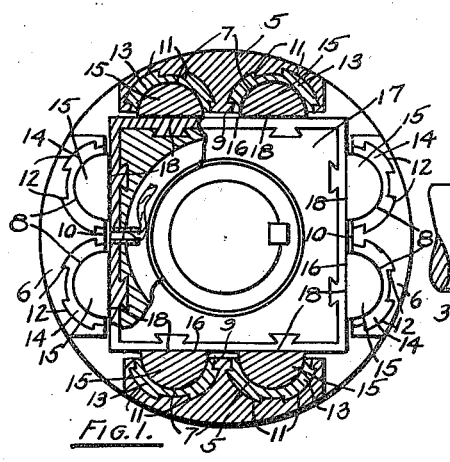
Fig. 1 is a view taken on a central horizontal plane of the coupling on the line 1—1 of Fig. 2 with certain parts broken away.
Figure 2:
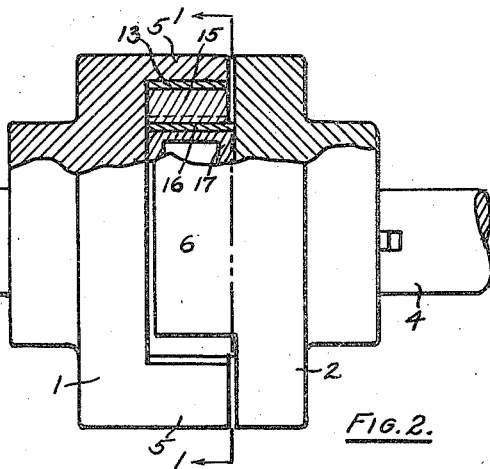
Fig. 2 is a side elevational view with parts broken away of my novel coupling.

Referring to the drawings, Figs. 1 and 2 show a driving and a driven member 1 and 2 mounted on shafts 3 and 4, the members 1 and 2 having integral jaws 5 and 6 with recesses 7 and 8 formed on the inner surfaces 9 and 10 thereof. The driving and driven members 1 and 2 may be cast or formed by any other suitable method and the recesses 7 and 8 and the grout holes 11 and 12 formed therein by coring or any other suitable operation.

Figures 4, 5:
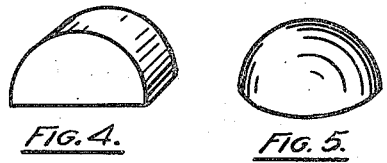
Fig. 4 is a perspective view of one form of bearing block which may be used in my coupling.
Fig. 5 is a perspective view of another form of bearing block.

Linings 13 and 14 are cast, formed, or molded in the recesses 7 and 8 and anchored by the grout holes 11 and 12, a rough surface being provided for better adherence of the linings 13 and 14. Bearing blocks 15 are disposed in the recesses 7 and 8 and contact the outer surfaces 16 of the coupling block 17 to transmit power from the driving member 1 to the driven member 2 and vice versa. The bearing blocks 15 may be of the forms shown in Figs. 4 and 5 although any suitable form may be used. The recesses 7 and 8 are formed to receive the particular bearing block to be used. The bearing blocks 15 may be of any suitable material such as metal, rubber, bakelite, fibre, and the like, a material which requires no lubrication being preferable. The bearing blocks 15 are tiltable and therefore the bearing surfaces 18 thereof remain in parallel relation with the contacting outer surfaces 16 of the coupling block 17 at all times regardless of the misalignment of the connecting shafts 3 and 4. This gives full contact on all parts of the faces 18 of the bearing blocks 15 insuring longer life, better wear, and more efficient operation in general. The bearing surfaces 19 of the coupling block 17 may be lined with any suitable material, a non-corrodible material being very desirable when the coupling is to operate in acid fumes. This coupling is ideal for use in acid fumes in that all contacting surfaces may be non-corrodible and the bearing blocks 15 are easily and quickly replaced and the linings for the recesses may be cast, formed or molded in place.

Figure 3:
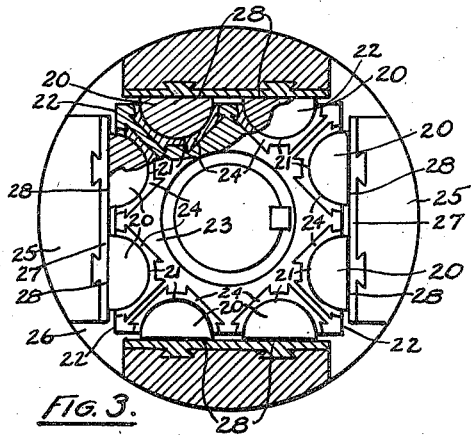
Fig. 3 is a view taken on a central horizontal plane of a modified form of coupling with certain parts broken away.

A modified construction is shown in Fig. 3 wherein the bearing blocks 20 are disposed in recesses 21 on the outer surfaces 22 of the coupling block 23. A cast, formed, or molded lining 24 of any suitable material is provided to insure a perfect seating surface for the bearing blocks 20 and also to minimize machine work. The linings 24 and bearing blocks 20 may be made of a non-corrodible material when the coupling is to be used in the presence of acid fumes. The jaws 25 of the coupling member 26 have a cast, formed, or molded lining 27 to contact the faces 28 of the bearing blocks 20 thus making all surfaces in contact not only quickly and cheaply replaceable but also quickly and cheaply repairable to a condition as good as when the coupling was new.

Figure 6:
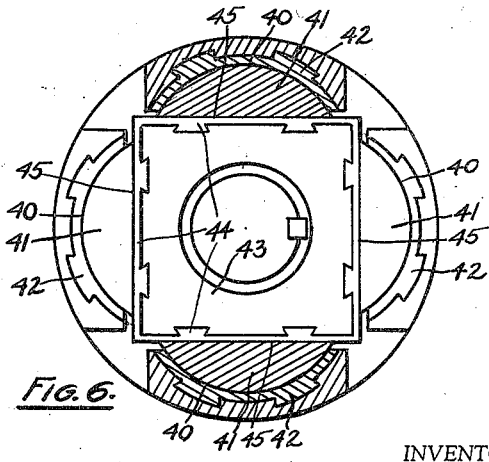
Fig. 6 is a view taken on a central horizontal plane of another modified form of construction of my novel coupling.

Fig. 6 shows a coupling as in Fig. 1 with a single recess 40 and bearing block 41 on each jaw instead of two as shown in Fig. 1. A cast, formed, or molded lining 42 is provided for the bearing blocks 41 in the recesses 40. A coupling block 43 having a lining 44 contacts the inner faces 45 of the bearing blocks 41 which are tiltable to serve the same purpose as it performs in the construction of Fig. 1, namely; to transmit power from the driving member to the driven member of the coupling.

Figure 7:
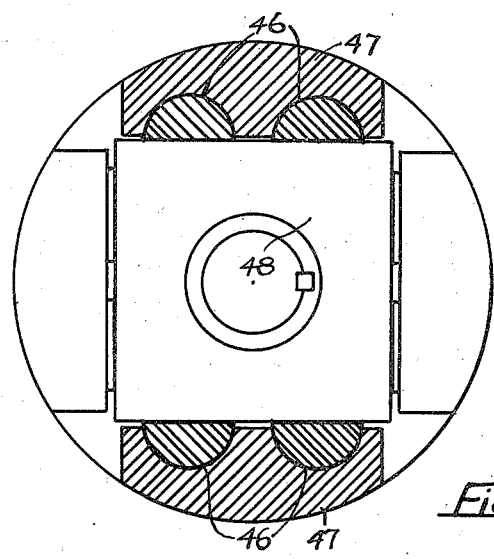
Fig. 7 is a view taken on a central horizontal plane of a coupling similar to that shown in Fig. 1 except that the coupling block is not lined.
Figure 8:
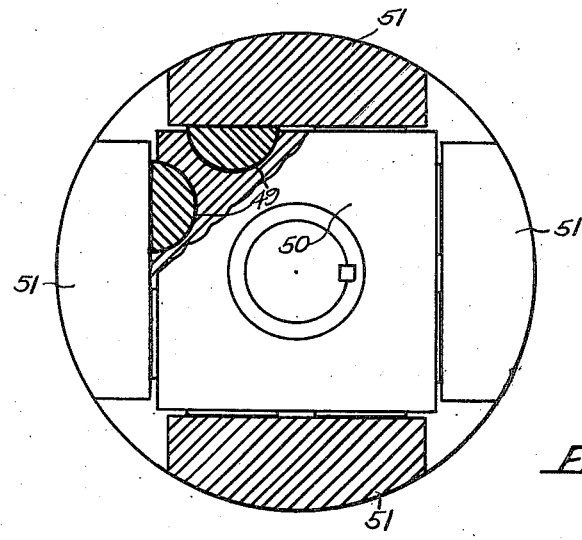
Fig. 8 is a view taken on a central horizontal plane of a coupling similar to that shown in Fig. 3 with the exception that no lining is provided for the jaws.

Fig. 7 shows a coupling similar to that shown in Fig. 1 with the exception that the recesses 46 in the jaws 47 have no provisions for a lining and the coupling block 48 has no lined outer surface. Fig. 8 shows a coupling similar to that shown in Fig. 3 with the exception that the recesses 49 in the coupling block 50 have no linings and the jaws 51 likewise have no linings formed on the inner bearing surfaces thereof.

It will be apparent that I have provided a novel coupling which requires a minimum of machine work to manufacture, whose contacting surfaces are quickly and cheaply replaceable and repairable, and whose bearing surfaces permit efficient operation in the presence of acid fumes without perceptible corrosion.

Various changes may be made in the specific embodiment of the present invention without departing from the spirit thereof, or within the scope of the appended claims.

What I claim is:

1. A coupling comprising a driving and a driven member, opposing jaws projecting from said driving and said driven member, removable bearing blocks mounted on said jaws, and a coupling block disposed between said bearing blocks on said jaws to transmit power from the driving member to the driven member.

2. A coupling comprising a driving and a driven member, opposing jaws projecting from said driving and said driven member, tiltable bearing blocks disposed on said jaws, and a coupling block disposed between said bearing blocks on said opposing jaws to transmit power from said driving member to said driven member.

3. A coupling comprising a driving and a driven member, opposing jaws projecting from said driving and said driven member having inner surfaces in substantial parallel relation with oppositely disposed inner surfaces, tiltable bearing blocks disposed on said inner surfaces of said jaws, a coupling block disposed between said bearing blocks on said jaws to transmit power from said driving member to said driven member.

4. A coupling comprising a driving and a driven member, opposing jaws on said members having inner recessed surfaces in substantial parallel relation with oppositely disposed inner surfaces, bearing blocks disposed in the recesses of said jaws, and a coupling block disposed between said bearing blocks in the recesses of said jaws to transmit power from the driving member to the driven member.

5. A coupling comprising a driving and a driven member, opposing jaws on said members having inner recessed portions, tiltable bearing blocks disposed in said inner recessed portions, and a lined coupling block disposed between the opposing bearing blocks on said jaws to transmit power from the driving member to the driven member.

6. A coupling comprising a driving and a driven member, opposing jaws on said members having lined inner recessed surfaces in substantial parallel relation with oppositely disposed inner bearing surfaces, bearing blocks disposed in the recesses of said jaws, and a coupling block disposed between said bearing blocks in the recesses of said jaws to transmit power from the driving member to the driven member and vice versa.

7. A coupling comprising a driving and a driven member, opposing jaws projecting from said driving and said driven member, tiltable bearing blocks disposed on the inner surfaces of said jaws, and a coupling block disposed between said opposing jaws having tiltable bearing blocks disposed on the surfaces thereof to transmit power from the driving member to the driven member and vice versa.

GEORGE H. THOMAS.